March 29, 1960 K. C. ALLISON 2,930,953

CAPACITANCE CONTROL UNIT

Filed Sept. 27, 1955

INVENTOR.
Kenneth C. Allison
BY Stanley H[illegible]
Atty.

2,930,953

CAPACITANCE CONTROL UNIT

Kenneth C. Allison, Crystal Lake, Ill.

Application September 27, 1955, Serial No. 536,957

3 Claims. (Cl. 317—249)

The present invention relates to a control unit for adjusting the capacitance of electrical circuits, and more particularly to such a control unit for use in the circuits of a television receiver so as to provide for fine tuning of each channel.

In order to avoid the introduction of unwanted and detrimental electrical circuits in the nature of capacitance factors which are encountered in very delicate and sharply tuned circuits of radio and television receivers, it has been necessary to employ shielding means to minimize the effect of such factors in the adjustment of the capacitance required to obtain the proper degree of selectivity and efficiency in the operation of such receivers. However, such shielding means not only add to the cost of manufacture of the receiver but the effectiveness of such shielding means is not all that is to be desired.

It is accordingly an object of the present invention to provide a novel control unit for adjusting the capacitance of the circuits of a television receiver which insures more efficient and stable operation of the receiver without the need for such shielding means.

Another object of this invention is to provide a capacitance control unit as indicated which is designed to meet a wide range of different structural and electrical conditions as presented in the receivers as produced by the various manufacturers. Thus the capacitance control unit forming the subject of this invention lends itself to the peculiar circuit conditions which is encountered in the various commercial products of the many manufacturers of receiving sets, thereby providing a unit which is readily installed as a sub-assembly at the factory where the receiver is manufactured or as a unit which is readily installed as a replacement by the repairman when such attention may be needed by the customer or user of the receiver.

In addition to the accurate restriction of capacitance adjustment to suit the specific circuit requirements of the receiver which is thereby made available to the manufacturer of the receiver or the repairman in servicing the set, the capacitance control unit contemplated by the present invention, by reason of its design, permits the customer to obtain fast and extremely sensitive variation in capacitance adjustment to insure a maximum degree of fine tuning within the range estabilsihed at the time of its installation.

The novel features which are considered to be characteristic of this invention are set forth with particularity in the appended claims. This invention, however, both as to its organization and method of operation, together with further objects and advantages thereof, may best be understood by reference to the following description taken in connection with the accompanying drawings, wherein:

Figures 1, 2, 3, 4, 5:
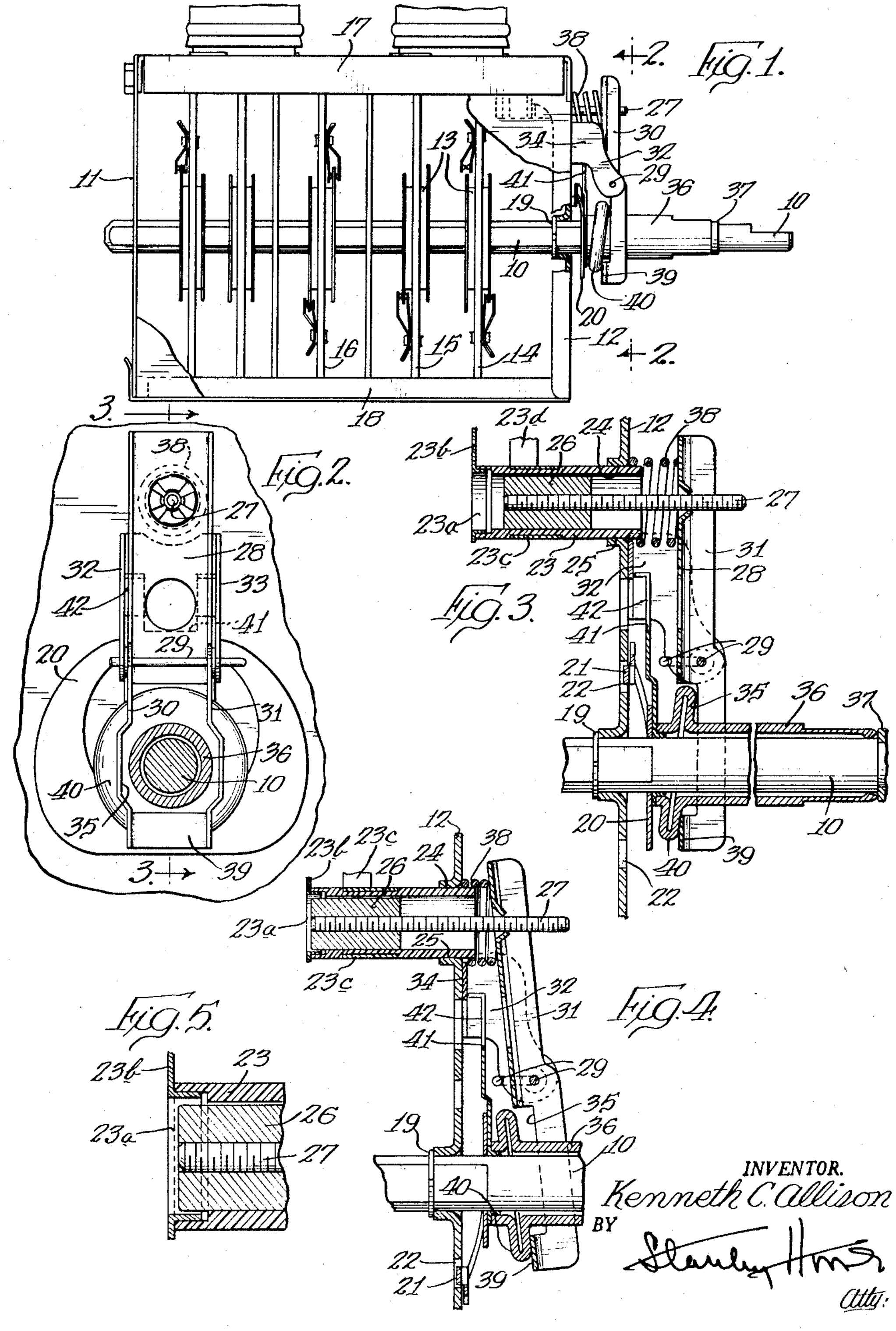
Fig. 1 illustrates a side view of a switching apparatus wherein a capacitance control unit in accordance with the present invention is shown as applied thereto for operation through means associated with the control shaft of such switching apparatus.
Fig. 2 is an enlarged fragmentary front view taken on line 2—2 of Fig. 1.
Fig. 3 is a fragmentary vertical section taken on line 3—3 of Fig. 2 showing the capacitance element in a position wherein the capacitance is of minimum value.
Fig. 4 is similar to Fig. 3 but showing the capacitance element in its position of maximum value.
Fig. 5 is an enlarged fragmentary sectional view of the capacitance control unit.

Referring more particularly to the drawings, the present invention is shown as embodied in a switch apparatus for selecting the circuits of a desired channel of a television receiver. Such switch apparatus includes an operating shaft 10 supported in suitable bearings for rotation within a tuner chassis having a rear panel 11 and a front panel 12. The shaft 10 has one or more flat sides fitting the opening of rotors 13 of a series of switch wafers 14, 15 and 16. The wafers are fixed to a wall 17 joining the upper edge of the rear panel 11 and the front panel 12 and to a strip 18 joining the lower edges of said rear and front panels. Rotation of the shaft 10 accordingly operates to turn the rotors 13 of the switch wafers whereby contact elements on the rotors may be selectively connected to the contacts on the switch wafer associated therewith. The shaft 10 is locked against axial movement in a direction forwardly of the rear panel 11 by a C-washer 19 disposed in a suitable slot formed in the shaft 10 which washer engages the rearwardly facing edge of a bushing-like extension of the front panel 12 surrounding the opening in the panel 12 through which the shaft 10 projects forwardly from the front face of the panel. A shoulder defining the limits of the flat sides of the shaft 10 along the portion of the shaft so projecting forwardly from the front face of the panel 12 is engaged by a spring index plate 20 which fits tightly around the shaft 10. The plate 20 is locked in a position against the shoulder thus provided on the shaft by means of staking ears formed integrally from the shaft 10 and also rotates in unison with the shaft 10. A finger 21 forming part of the spring index plate 20 cooperates with a plurality of detent positions 22 formed in the panel 12 facing said plate 20 to control the indexed positions of the shaft 10.

An adjustable variable capacitor assembly as contemplated by the present invention includes a stator tube 23 of suitable dielectric material fixed within an opening 24 in the front panel 12 of the tuner assembly so as to extend a distance inwardly from the front panel 12 with the axis of the tube in parallel relation to the axis of the shaft 10. As shown in the drawing, a cemented joint is provided between the tube 23 and the panel opening 24 containing the tube so as to establish a suitable fastening of the tube 23 on the panel 12. The open end of the tube 23 most distant from the front panel 12 of the tuner assembly is internally fitted with an electrode in the form of a collar or liner 23$^a$ and integral strip 23$^b$ extending from said liner provides for a terminal connection to said liner. As clearly shown in Fig. 5, the liner 23$^a$ presents an inwardly facing annular surface concentric with the longitudinal axis of the tube 23 of slightly greater diameter than the annular surface presented by the interior of the portion of the tube 23$^a$ which extends therefrom in the direction of the front panel 12. It is accordingly possible, as shown in Fig. 5, to obtain an extremely small air dielectric condition between the electrode or liner 23$^a$ and the capacitor element, represented by the numeral 26, when the latter occupies a position to present its leading end within the confines of said liner 23$^a$. The external wall of the stator tube 23 is provided with an encircling band of conductive material such as copper foil to provide the second electrode 23$^c$ having an integral extension *23d* which also affords a terminal connection to said electrode *23c*.

The capacitor element 26, which is of cylindrical contour is mounted for movement relative to the tube 23 toward and away from the electrode 23a along a path coaxially of the tube 23 by means of a supporting rod 27 of dielectric material. The rod 27 is provided with threads which have interengagement with the threads of a central bore extending from end to end of the capacitor element 26. The rod 27 is of such length as to protrude outwardly from the front face of the panel 12 whereby the rod 27 may be manipulated from a position at the front of the panel.

In accordance with an embodiment of this invention as illustrated herein, the rod 27 is movable to vary the position of the capacitor element 26 with respect to the electrode 23a between limits fixed by a lever 28 supported for rocking movement about an axis transverse to the longitudinal axis of the rod 27 by means of a pin 29. The rod 27 also has threaded connection with the lever 28 so as to provide for adjustment of the rod relative to the lever and thereby establish a predetermined range of movement of the capacitor element 26 with respect to the electrode 23a in accordance with the circuit requirements of the particular type of tuner with which the capacitor control unit is associated. As shown in the drawings, the lever 28 has upturned flanges 30 and 31 along the opposite longitudinal edges thereof which are straddled by spaced parallel ears 32 and 33 of a mounting bracket 34 fixed to the front face of the panel 12. The pin 29, about which the lever is supported for rocking movement, has sliding fit through registering openings formed in said ears of the mounting bracket and the flanges of the lever 28. Thus the pin 29 provides a demountable connection between the lever 28 and the bracket 34 so as to facilitate assembly and disassembly of the parts of the capacitor control unit with respect to the switching apparatus to which it is to be applied.

The end of the lever 28 opposite to the end thereof connected to the rod 27 is provided with a clearance opening through which the shaft 10 and a sleeve 36 journalled on the shaft 10 projects so as to be straddled by the flanges 30 and 31 of the lever. A lock ring 37 disposed in a slot formed in the shaft 10 engages one end of the sleeve 36 to limit relative axial movement of the sleeve 36 in a direction outwardly of the portion of the lever straddling the sleeve. A coil spring 38 surrounding the portion of the threaded rod 27 between the lever 28 and the surface of the front panel 12 opposite thereto acts to normally urge the lever in a direction to move the capacitor element 26 away from the rearward end of the stator tube 23. A cam follower 39 forming an extension of the end of the lever 28 remote from the end thereof connected to the rod 27 is accordingly urged toward a raised cam 40 on the sleeve 36. As shown, the cam 40 represents a portion of the sleeve 36 squeezed and gathered axially upon itself and the surface of the cam facing the follower 39 is inclined relative to the axis of the sleeve whereby rotation of the sleeve causes the cam to act on the follower 39 to move the lever 26 against the pressure of the spring 38. This action causes the capacitor element 26 to be moved toward the electrode 23a. As the sleeve 36 is turned the cam and cam follower thereby cooperate to vary the position of the capacitor element 26 relative to the electrode 23a within the range of movement of the lever 28.

An anti-rotation washer 41 interposed between the index spring plate 20 and the end of the sleeve opposite thereto is provided with a radial extension 42 which extension is trapped between the ears of the mounting bracket 34 fixed to the panel 12, whereby the sleeve 36 is allowed to move independently of the shaft 10 while the washer is effective to restrain rotation of the sleeve 36 in unison with the shaft 10. The end of the sleeve 36 extending in the direction of the lock ring 37 is provided with one or more flat sides which cooperate to provide a locked connection with a suitable operating knob (not shown).

By the use of an operating member such as the rod 27 of dielectric material in accordance with the present invention, the problem of eliminating the undesired oscillator radiation in the area of the capacitor control unit is most effectively accomplished without the use of shielding means. It will also be noted that the length of the rod 27 relative to its cross-sectional dimension is sufficiently great to obtain a range of flexibility consistent with bending needed to accommodate the variation between the center line of the stator tube 23 and the location of the axis of the rod 27 at its intersection with the lever 28 as said location is varied in response to rocking movement of the lever 28 between its limits of such movement.

A capacitance control unit embodying the features of the present invention accordingly provides a high degree of adaptability in the production of switching apparatus for various types of television receivers not possible in the construction of former units. In addition the present unit utilizes a construction and arrangement that enables the user of the television receiver to control the selectivity of the circuits of each channel with a maximum of accuracy and stability.

What is claimed is:

1. In a switching apparatus for selecting one of a plurality of circuit connections including a chassis having a supporting front panel, an operating shaft supported for rotation about an axis generally normal to said panel, and rotating switch means connected to said shaft for rotation by said shaft, a variable capacitor assembly for adjusting the circuits established by said switching means comprising a lever, pivot means mounting said lever on said chassis for pivotal movement about an axis transverse to the axis of said operating shaft, a sleeve journaled on said operating shaft and having a cam surface in engagement with said lever whereby rotation of said sleeve produces pivotal movement of said lever, resilient means urging said lever against said cam surface, a variable capacitance unit mounted on said chassis and having a variable portion movable generally parallel to said shaft, and threaded means interconnecting said variable portion and said lever and rotatable from a position forwardly of said front panel whereby the capacitance of said capacitance unit may be varied through a range by rotation of said sleeve and said range may be varied by rotation of said threaded means.

2. The apparatus of claim 1 wherein said threaded means is a threaded dielectric rod and said capacitance unit is a cylindrical device having a cylindrical plunger connected to said rod for varying the capacitance of said unit.

3. The apparatus of claim 1 wherein an anti-rotation washer yieldably engages said sleeve and is fixed against rotation relative to said chassis whereby rotation of said sleeve is prevented when said shaft is rotated.

References Cited in the file of this patent

UNITED STATES PATENTS

| | | |
|---|---|---|
| 286,215 | Mills | Oct. 9, 1883 |
| 1,623,742 | McDonald | Apr. 5, 1927 |
| 2,449,577 | Bailey | Sept. 21, 1948 |
| 2,483,105 | Rennick | Sept. 27, 1949 |
| 2,562,263 | Ehrlich | July 31, 1951 |
| 2,591,717 | Page | Apr. 8, 1952 |
| 2,688,177 | Wagner | Sept. 7, 1954 |
| 2,745,993 | Foster | May 15, 1956 |

FOREIGN PATENTS

| | | |
|---|---|---|
| 263,948 | Great Britain | Jan. 10, 1927 |